US008107099B2

(12) United States Patent
Loce et al.

(10) Patent No.: US 8,107,099 B2
(45) Date of Patent: Jan. 31, 2012

(54) WATERMARKING

(75) Inventors: Robert P. Loce, Webster, NY (US); Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1986 days.

(21) Appl. No.: 11/166,298

(22) Filed: Jun. 24, 2005

(65) Prior Publication Data

US 2006/0290992 A1    Dec. 28, 2006

(51) Int. Cl.
*H04N 1/40*    (2006.01)
(52) U.S. Cl. ...................... 358/1.14; 358/3.28
(58) Field of Classification Search ............... 358/3.28, 358/3.23, 1.9, 1.14; 382/100; 355/201
See application file for complete search history.

(56) References Cited

U.S. PATENT DOCUMENTS

| | | | |
|---|---|---|---|
| 4,168,088 A | 9/1979 | Somlyody | |
| 4,186,944 A | 2/1980 | Pearce | |
| 4,210,346 A | 7/1980 | Mowry, Jr. et al. | |
| 4,227,719 A | 10/1980 | McElligott et al. | |
| 4,227,720 A | 10/1980 | Mowry, Jr. et al. | |
| 4,265,469 A | 5/1981 | Mowry, Jr. et al. | |
| 4,310,180 A | 1/1982 | Mowry, Jr. et al. | |
| 4,420,175 A | 12/1983 | Mowry, Jr. | |
| 4,812,913 A * | 3/1989 | Knop et al. | 358/474 |
| 5,015,555 A * | 5/1991 | Lazaar | 430/281.1 |
| 5,291,243 A * | 3/1994 | Heckman et al. | 399/3 |
| 5,340,159 A | 8/1994 | Mowry, Jr. | |
| 5,381,220 A * | 1/1995 | Acquaviva et al. | 399/367 |
| 5,387,976 A * | 2/1995 | Lesniak | 356/627 |
| 5,437,897 A | 8/1995 | Tanaka et al. | |
| 5,479,507 A | 12/1995 | Anderson | |
| 5,488,664 A | 1/1996 | Shamir | |
| 5,678,863 A * | 10/1997 | Knight et al. | 283/113 |
| 5,842,105 A * | 11/1998 | Acquaviva | 399/406 |
| 6,383,719 B1 * | 5/2002 | Bula et al. | 430/312 |
| 6,463,162 B1 * | 10/2002 | Vora | 382/100 |
| 6,721,440 B2 | 4/2004 | Reed et al. | |
| 6,782,509 B1 | 8/2004 | Hirayama et al. | |
| 6,950,194 B2 * | 9/2005 | Sandstrom | 356/508 |
| 7,002,710 B1 * | 2/2006 | Van Liew et al. | 358/3.28 |

(Continued)

FOREIGN PATENT DOCUMENTS

JP    2003326802 A    11/2003

OTHER PUBLICATIONS

Computer-generated English translation of JP2003032802 (A) at http://www4.ipdl.inpit.go.jp/cgi-bin....., last visited Nov. 10, 2010.

(Continued)

*Primary Examiner* — King Poon
*Assistant Examiner* — Allen H Nguyen
(74) *Attorney, Agent, or Firm* — Fay Sharpe LLP

(57) ABSTRACT

A watermark is provided for use with images or image portions, such as saturated text. The watermark is provided as a modulation to the optical density of a public image or image portion wherein both modulated and unmodulated portions of the public image or image portion have an optical density that is beyond a threshold optical density beyond which the human visual system has a low sensitivity to optical density variations. Alternatively, the modulation is made at such a low amplitude as to be difficult to perceive by the human visual system. The modulation may be applied via an overprinting operation. Alternatively the modulation may be applied to image data prior to printing.

23 Claims, 5 Drawing Sheets

U.S. PATENT DOCUMENTS

| | | | |
|---|---|---|---|
| 7,027,187 B1 * | 4/2006 | Zuber | 358/1.9 |
| 7,039,214 B2 * | 5/2006 | Miller et al. | 382/100 |
| 7,054,463 B2 * | 5/2006 | Rhoads et al. | 382/100 |
| 7,086,599 B2 * | 8/2006 | Murakami et al. | 235/487 |
| 7,104,709 B1 * | 9/2006 | Maher et al. | 400/76 |
| 7,149,451 B2 * | 12/2006 | Uchida et al. | 399/81 |
| 7,248,809 B2 * | 7/2007 | Kim et al. | 399/81 |
| 2002/0181025 A1 * | 12/2002 | Yamaguchi | 358/3.28 |
| 2003/0159046 A1 * | 8/2003 | Choi et al. | 713/176 |
| 2004/0041898 A1 * | 3/2004 | Nakamura | 347/172 |
| 2004/0197029 A1 | 10/2004 | Brundage et al. | |
| 2004/0234098 A1 | 11/2004 | Reed | |

OTHER PUBLICATIONS

Phillips, George K., "New Digital Anti-Copy/Scan and Verification Technologies," website http://www.verifyfirst.com/, 9 pages, Jun. 2006.

\* cited by examiner

WATERMARKING

BACKGROUND

Aspects of the present disclosure and embodiments thereof include methods and systems for providing security for a document. For instance, security is provided by varying or modulating the optical density of a portion of a document having a level of optical density at which the human visual system (HVS) has difficulty perceiving variations in optical density or at an optical density modulation or variation amplitude at which the HVS has difficulty perceiving. The variations or modulations in optical density may be provided by overprinting. Alternatively, modulation may be achieved by modifying image data. Embodiments are described with reference to a text image and a text watermark. However, the methods and systems disclosed herein can be applied to other images and may apply to other watermarks, including, but not limited to, bar codes and data glyphs.

Typically, watermarking and other security features are applied to high value or high volume documents. For example, security features are included in currency, checks and negotiable securities. The protection of high volume and high value documents can justify relatively complicated security mechanisms. Additionally, high value and high volume documents can justify relatively complicated document design. For instance, time can be spent designing visually pleasing tints or halftoned images that can be used to mask or otherwise accommodate watermarking techniques.

For example, U.S. Pat. No. 6,721,440 B2 to Reed, et al., issued Apr. 13, 2004 for Low Visibility Watermarks Using an Out-of-Phase Color discusses embedding a media signal with a digital watermark component. The media signal includes a cyan color plane, a magenta color plane, a yellow color plane color and a black plane. The digital watermark component is embedded in cyan, magenta and yellow color planes. The digital watermark component is inverted and embedded in the black color plane. The protection of high volume and high value documents may justify the inclusion of cyan, magenta, yellow and black color planes or separations that can accommodate such security schemes.

However, there has been desire for systems and methods for protecting or watermarking less complicated, low volume, low value documents such as, for example, coupons and gift certificates that might be produced and distributed for or by a small business or organization.

BRIEF DESCRIPTION

A method for providing security for a document can include printing a public portion of the document at a public portion optical density and printing a private portion of the document, within a position of at least a portion of the public portion of the document, at a private portion optical density that is sufficient to generate a private or combined optical density that is sufficiently different from the public portion optical density to be perceptible in contrast with the public optical density when the document is viewed in transmission, at glancing angles and/or when the document is scanned and processed through contrast enhancement, but insufficient to be perceived when viewed casually in reflection by the human visual system.

A document processing system can include a public image definer, a private image definer and an image combiner. The system can also include, or be associated with at least one marking engine.

For instance, the a public image definer can be operative to generate or identify a public portion of a document to be rendered with a first colorant and first colorant density to be render the public portion at a public portion optical density. The private image definer can be operative to generate or identify a private portion of the document to be rendered with a second colorant and second colorant density to render the private portion at a private portion or combined optical density that when a portion of the document associated with the private portion is contrasted with the public portion, the private or combined optical density is sufficient to be perceptible in contrast with the public optical density when the document is viewed in transmission, at glancing angles and/or when the document is scanned and processed through contrast enhancement, but insufficient to be perceived when viewed casually in reflection by the human visual system. The first and second colorants can be the same colorant. The image combiner can be operative to control, or generate signals that can be used to control, the at least one marking engine so as to print a combination of the public image and the private image.

DETAILED DESCRIPTION

Figure 1:
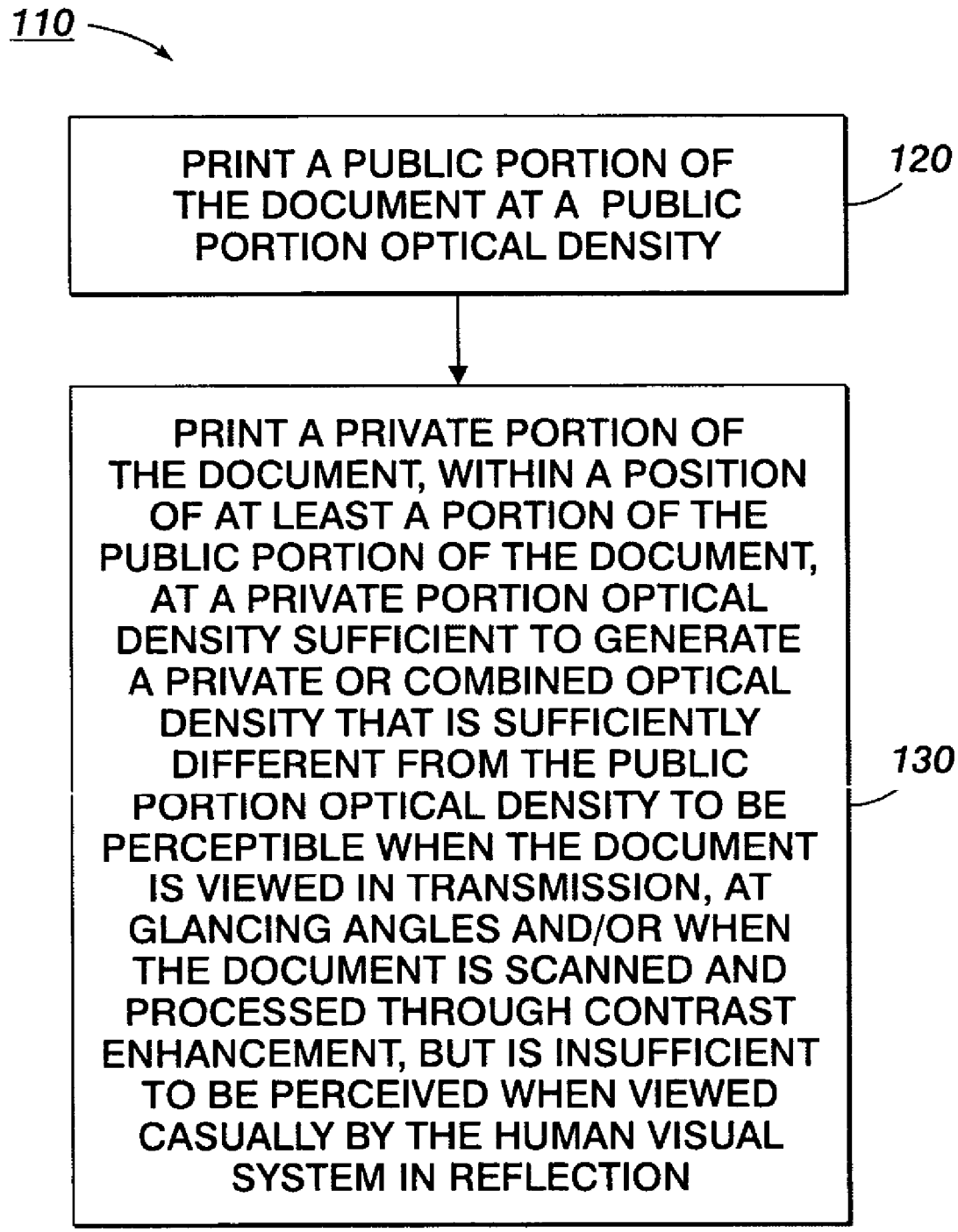
FIG. 1 is a flow chart outlining a method for protecting a document.

Referring to FIG. 1, a method 110 for providing security for a document can include printing 120 a public portion of the document at a public portion optical density. The public portion optical density can be, but is not necessarily, above a threshold optical density beyond which the human visual system (HVS) has low sensitivity, and printing 130 a private portion of the document, within a position of at least a portion of the public portion of the document, at a private portion optical density sufficient to generate a private or combined optical density that is sufficient to be perceptible when the document is viewed in transmission, at glancing angles and/or when the document is scanned and processed through contrast enhancement, but insufficient to be perceived when viewed casually by the human visual system (HVS) in reflection. One way to achieve this is to render both the public portion and the private or combined portion at optical densities that are above the threshold optical density described above. Another way to achieve this is to render the private or combined portion at an optical density that is so close to the optical density of the public portion as to be difficult for the HVS to perceive. In other words, one way to achieve printing 130 a private portion of the document, within a position of at least a portion of the public portion of the document, at a private portion optical density sufficient to generate a private or combined optical density that is sufficient to be perceptible when the document is viewed in transmission, at glancing angles and/or when the document is scanned and processed through contrast enhancement, but insufficient to be perceived when viewed casually by the human visual system (HVS) in reflection is to apply a modulation to the public image at such a sufficiently low amplitude as to be difficult to perceive in reflection, but at sufficiently high amplitude to be detectable through, for example, image processing techniques.

Figure 2:
FIG. 2 illustrates a protected document.

For example, referring to FIG. 2, printing 120 a public portion of the document can include printing a public message, image or illustration 210 of a document 214, such as a coupon or gift certificate. The message is printed 120 at an optical density beyond a threshold at which the HVS has low sensitivity. For instance, the public message or illustration 210 is printed as a saturated or nearly saturated dark black or dark color such as dark blue (which can include the use of several colorants).

For example, optical density (OD) can be defined as the negative logarithm of the transmittance or reflectance ratio, i.e., transmission optical density=$-\log_{10}$(transmittance), reflectance optical density=$-\log_{10}$(reflectance).

The HVS has difficulty discerning density variations above a reflectance optical density of about 1.8. That is, when a portion of a document is darker than some threshold optical density in a range around about 1.8, it is likely that fluctuations, variations or modulations in density above or near that optical density will go unnoticed by a human observer. For instance, tests indicate that optical densities above an optical density sufficient to generate a lightness measurement of no greater than about $L^*=8$ are beyond the threshold optical density beyond which the HVS has low sensitivity. Therefore, printing 120 the public portion (e.g., 210) of a document (e.g., 214) at a public portion optical density that is beyond a threshold optical density beyond which the HVS has low sensitivity can include printing the public portion of the document at an optical density above about 1.8 or at an optical density sufficient to generate a lightness measurement of no greater than about $L^*=8$.

Additionally, or alternatively, the HVS has difficulty discerning optical density differences associated with $\Delta L^*$ of equal to or less than about 1. Therefore, printing 120 a public portion of the document at a public portion optical density and printing 130 a private portion of the document, within a position of at least a portion of the public portion of the document, at a private portion optical density sufficient to generate a private or combined optical density that is sufficient to be perceptible when the document is viewed in transmission, at glancing angles and/or when the document is scanned and processed through contrast enhancement, but insufficient to be perceived when viewed casually by the human visual system (HVS) in reflection can include printing the private portion so as to achieve a private or combined optical density that is different in $L^*$ by a $\Delta L^*$ of equal to or less than about 1, independent of the overall optical density of the public and private portions (i.e., the public and private or combined optical densities may be less than the threshold optical density beyond which the human visual system (HVS) has low sensitivity as long as the optical density modulation amplitude is sufficiently low).

Figure 3:
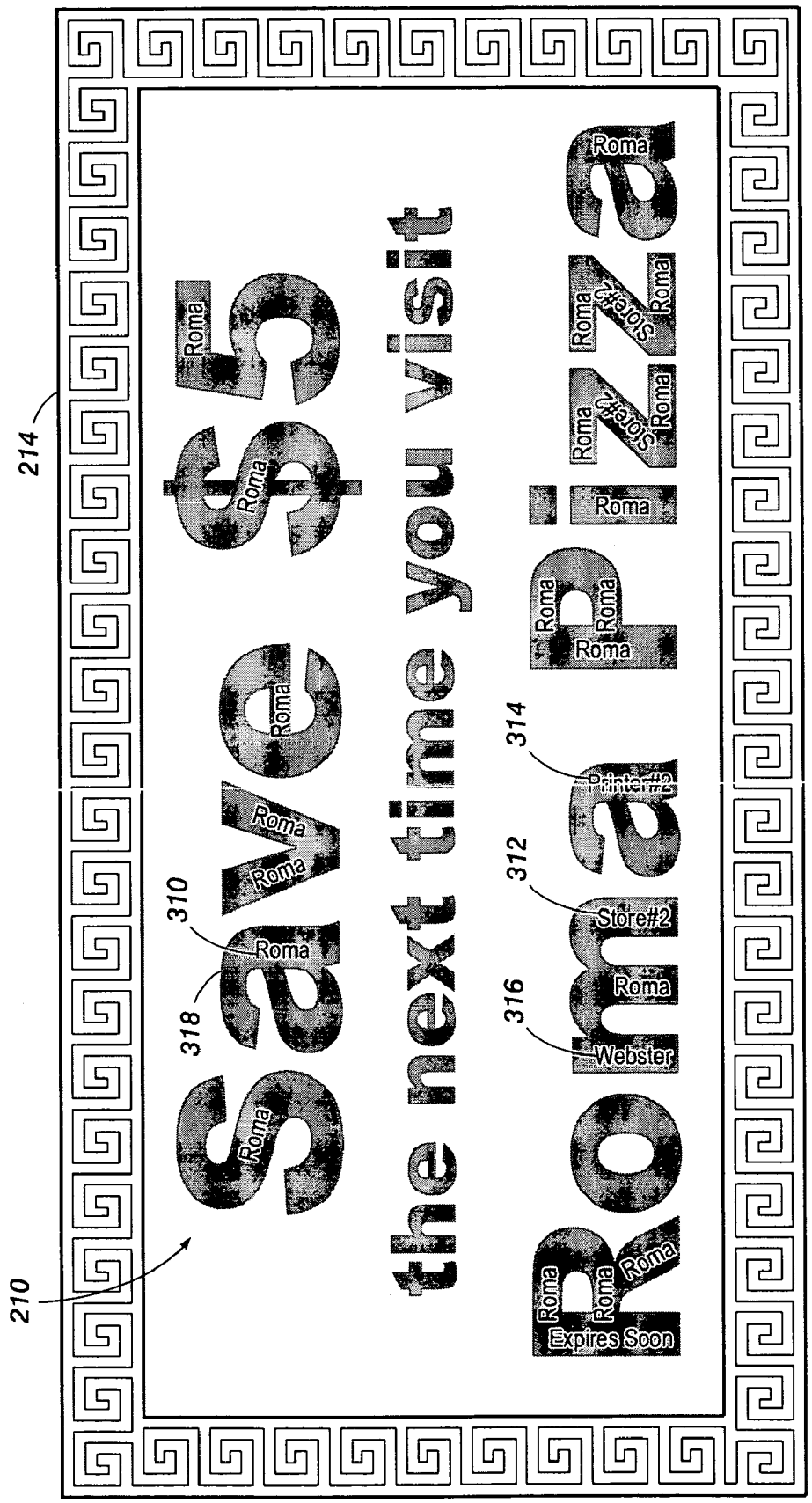
FIG. 3 is a schematic diagram of the document of FIG. 2 illustrating features of the document that are not visible in the illustration of FIG. 2.

Referring to FIG. 3, printing 130 the private portion of the document within a position of at least a portion of the public portion of the document can include printing one or more private messages or pieces of information (e.g., 310, 312, 314, 316) within a portion of the public portion of the document that is of sufficient size and shape to receive or overlap the private portion of the document. For instance, a first private portion 310 is printed 130 within a position of a letter 318 of a word in the public message or image 210. Second 312, third 314 and fourth 316 private portions of the document 214 are printed 130 within other positions of other portions of the public portion 210 of the document 214. Printing 130 the private portion at a private portion optical density sufficient to generate a private or combined optical density that is sufficient to be perceptible when the document is viewed in transmission, at glancing angles and/or when the document is scanned and processed through contrast enhancement, but is insufficient to be perceived when viewed casually by the HVS in reflection, can include printing 130 the private portion at the same or nearly the same optical density as the public portion in a second printing or layered overprint operation. Alternatively, the private portion may be printed 130 first and the public portion printed 120 in an overprinted or layered fashion. Alternatively, the private portion may be printed 130 at a different optical density than the public portion so long as the private or combined optical density of the public portion and the private portion is sufficient to be perceptible when the document is viewed in transmission, at glancing angles and/or when the document is scanned and processed through contrast enhancement.

As used herein,—combined optical density—refers to the optical density achieved by overprinting a first image, such as a private image, on top of a second image, such as a public image. A private optical density refers to the optical density of a private image or image portion. Therefore—private optical density—is the used in regard to the private image where public image data is digitally modulated or adjusted in accord with a private image and a protected document is rendered in a single printing operation in accord with the digital modulation or adjustment. Alternatively, for example, the public image may be rendered, in a first printing operation, to include gaps or place holders, which receive the private image in a second printing operation. The order of these printing operations may be reversed. In any event, the phrase—private optical density—is used in reference to these embodiments since these embodiments do not include modulation by overprinting or layering one image on top of another.

It should be understood that FIG. 3 is schematic in nature. For purposes of illustration, in FIG. 3, the public message 210 is illustrated at a relatively low optical density to allow the private message (e.g., 310-316) to be viewed in reflection for purposes of explanation.

In some embodiments, printing 120 the public portion and printing 130 the private portion can include, for example, printing 120 the public portion with a public colorant and a public colorant density sufficient to generate a public optical density sufficient to generate a lightness measurement of no greater than about $L^*=8$ and printing 130 the private portion with a private colorant and private colorant density sufficient to generate a private or a combined optical density sufficient to generate a darker lightness measurement. For example, where the lightness measurement of the public portion is about $L^*=8$, the private or combined optical density may be sufficient to generate a lightness measurement of about 7.9, 7.5, 6, 5 or lower.

Alternatively, the public portion may be printed darker than the private portion. For instance, printing the private portion of the document within a position of at least a portion of the public portion of the document can include digitally combining the public portion of the document and the private portion of the document and associating the public portion with a first colorant density and associating the private portion of the document with a second colorant density, thereby generating a combined image (the second colorant may be the same as the first colorant). As long as the first colorant density and the second colorant density are above the threshold optical density beyond which the HVS has a low sensitivity to density differences during casual observation, the printed 130 private portion will be hidden or obscured by the perceived low contrast associated with the surrounding public portion.

Therefore, printing 130, 120 the private and public portion can include printing 130 the private portion with a private colorant and a private colorant density sufficient to generate a private or combined optical density sufficient to generate a lightness measurement no greater than about $L^*=8$ and printing 120 the public portion with a public colorant and a public colorant density sufficient to generate a darker lightness measurement. For example, where the private portion optical density is sufficient to generate a lightness measurement of about $L^*=8$, the public colorant density can be sufficient to generate a lightness measurement of about 7.9, 7.5, 6, 5 or any other measurement darker than about $L^*=8$.

Alternatively, printing 130, 120 the private and public portion can include printing 130 the private portion with a private colorant and a private colorant density to generate a private or combined optical density sufficient to generate a lightness difference measurement no greater than about $\Delta L^*=1$ between the public optical density and the private optical density. The private or combined portion can be lighter or darker than the public portion. If this condition is met, then the public and private or combined optical densities can be associated with lightness measurements greater than the $L^*=8$ measurement discussed above.

Whether the public and private portions (e.g., 210, 310-316) are printed 120, 130 through a two-step overprinting process or are first digitally combined and rendered in a single printing step, as long as the public (e.g., 210) and private (e.g., 310-316) portions are rendered at optical densities where the HVS has a low sensitivity to optical density differences or contrast, the private portion (e.g., 310-316) of the document will go unnoticed by the casual observer and can be used as a security watermark for the document (e.g., 214).

For instance, if the public portion and the private portion are both printed 120, 130 with a black colorant, then the document may appear, as illustrated in FIG. 2, to include only the public portion (e.g., 210) even though a private portion (e.g., 310-316) is included in the document. Additionally, casual counterfeiting attempts by, for example, photocopying, can be thwarted.

For instance, while a sophisticated or trained user may be able to take advantage of the dynamic range of a scanner and image processing software to contrast stretch a scanned document (e.g., 214) in order to detect the private image (e.g., 310-316), system noise and other aspects of the document reproduction process would make it difficult for the casual counterfeiter to reproduce copies of the document (e.g., 214) that include a high quality reproduction of the watermark or private information (e.g., 310-316) that appear the same as genuine specimens of the document (e.g., 214).

For example, each time someone presents a specimen of a document for redemption or other purpose, a recipient of the document (e.g., 214), that is aware that genuine specimens include the private portion (e.g., 310-316), may examine or test the received document to determine an authenticity thereof. For instance, a cashier or clerk may view a received document in transmission. That is, the recipient may place the document in front of a light source and look for the private portion (e.g., 310-316). Alternatively, the received document may be observed at a glancing angle or scanned and processed by contrast stretching software and displayed to allow the recipient or other person to determine if the private portion (e.g., 310-316) is included in the received document. Alternatively, the scanned image may be processed by character or image recognition software which may determine whether or not the private portion (e.g., 310-316) is included in the received document.

Figure 4:
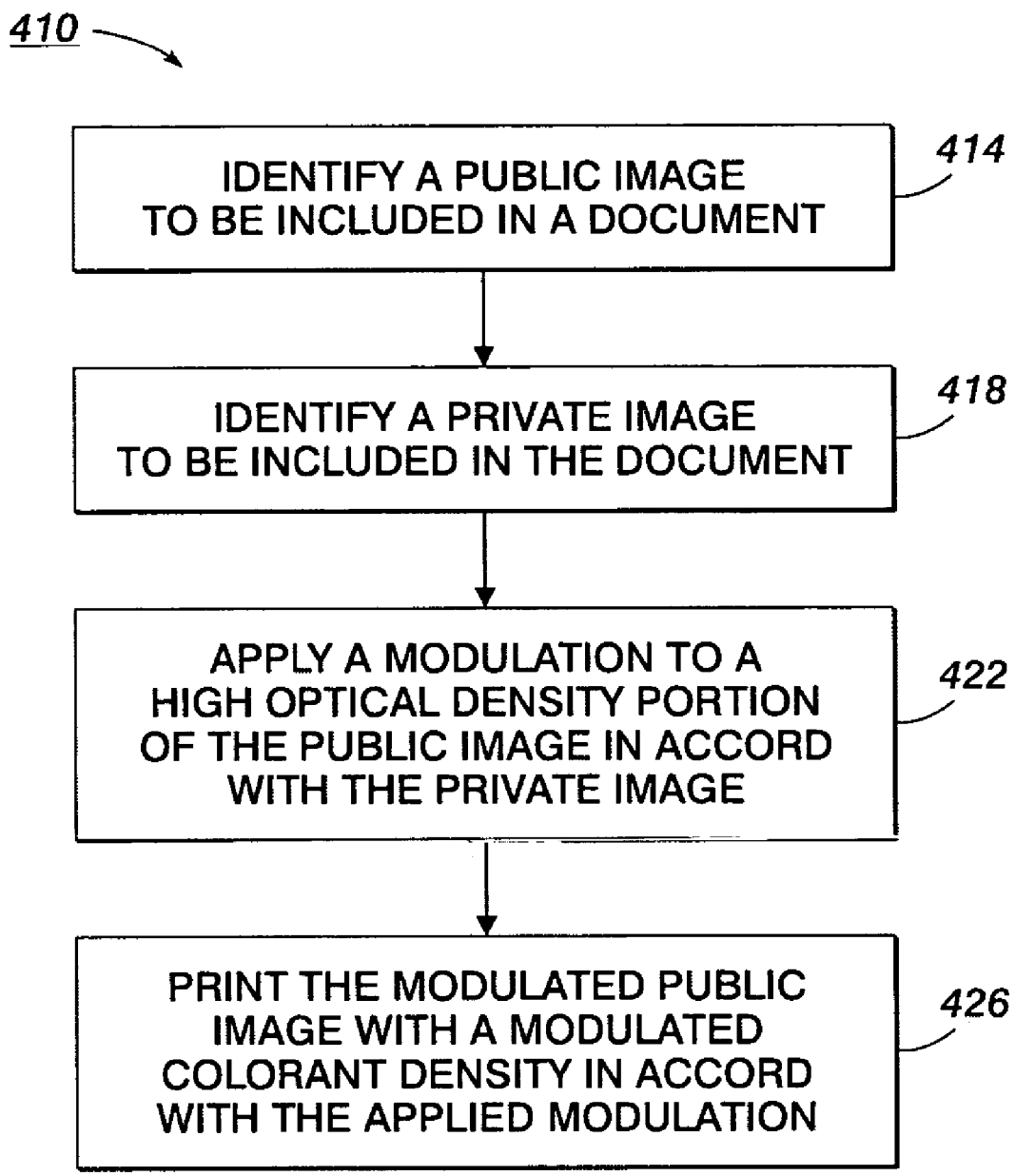
FIG. 4 is a flow chart outlining a method for providing security to a document.

Referring to FIG. 4, an illustrative embodiment includes a method 410 for providing security for a document. The method 410 can include identifying 414 a public image to be included in the document (e.g., 214), identifying 418 a private image (e.g., 310-316) to be included in the document (e.g., 214), applying 422 a modulation to a high optical density portion (e.g., 318) of the public image (e.g., 210) in accord with the private image (e.g., 310) and printing 426 the modulated public image with the modulated colorant density in accord with the applied 422 modulation.

Identifying 414 a public image can include reviewing a preprinted document to locate a high saturation or high optical density or other convenient portion of the preprinted public image of the preprinted document. Alternatively, identifying 414 a public image can include designing or authoring a public image (e.g., 210) for the document using a word or document processor. In yet another alternative, identifying 414 a public image can include receiving a pre-authored image in electronic form or as an image included on print media that is then scanned and used as a public image or public image portion.

Identifying 418 a private message to be included in the document can include authoring or creating the private message. For example, identifying 418 the private message can include generating or authoring a text message such as an identification, such as a name (e.g., 310), a store or unit number (e.g., 312), a printer or document manufacture identification (e.g., 314), a location (e.g., 316) or other text string, such as a code word or encrypted message. Alternatively, identifying 418 the private message can include generating, authoring or receiving a machine readable symbol or group of symbols, such as, for example, a bar code or data glyph. Identifying 418 the private message can include generating or authoring the private message with a word or document processor. Alternatively, identifying 418 the private message can include receiving the private message in electronic form or in the form of an image provided on print media which is then scanned into a document authoring tool.

Applying 422 a modulation to a high optical density portion of the identified 418 public image (e.g., 210, 318) in accord with the identified 418 private image (e.g., 310) can include adjusting colorant values of portions of the public image according to the private image such that the adjusted and unadjusted colorant values of the public image call for colorants and colorant densities associated with optical densities that are above an optical density threshold beyond which the human visual system has a low sensitivity to density differences during casual observation (e.g., OD greater than about 1.8 or $L^*$ less than or equal to about 8) or at adjusting colorant values of portions of the public image according to the private image such that the adjusted and unadjusted colorant values of the public image call for colorants and colorant densities associated with optical densities that are sufficiently similar as to be associated with a lightness difference measurement no greater than about $\Delta L^*=1$. Alternatively, the modulation can be applied 422 by overprinting during the printing 426 process.

For instance, an image or document authoring tool can be used to define document layers. The identified 414 public image and the identified 418 private image can be included on separate layers and aligned in an overlapping or layered fashion. The aligned images are then interpreted as instructions for adjusting colorant values of portions of the public image as described above, or they are interpreted as instructions regarding an overprinting operation. For example, a preprinted document may include one or the other of the identified 414 public image or identified 418 private image. The preprinted document is scanned and aligned with the image to be overlaid using document authoring tools during a modulation application 422 procedure. The preprinted documents are loaded into a media input associated with a marking engine (e.g., see FIG. 5). The alignments carried out with the document authoring tool are interpreted as instructions for overprinting (e.g., 426), in a layered fashion, whichever of the identified 414 public image or the identified 418 private image is not included on the preprinted document.

Alternatively, applying 422 the modulation and printing 426 the modulated public image can include printing both the identified 414 public image and the identified 418 private image. For instance, if the overlaying of image layers is interpreted as instructions to digitally combine the public image portion or image and the private portion or image, then the image resulting from the digital combination is used as a signal for controlling a marking engine to print 426 the modulated public image with a modulated colorant density in accord with the applied 422 modulation in a single marking pass (which may include the application of several different colorants).

In yet another alternative, applying 422 the modulation and printing 426 the modulated public image in accord with the applied 422 modulation can include two or more marking passes. For instance, after one of the identified 414 public image or the identified 418 private image is rendered by a first marking pass, the other image may be rendered with a second marking pass. For instance, after the first image is rendered, a system operator may remove marked print media from a media output and reload the print media into a media input of a marking engine. The marking engine may then be controlled according to the layering designated earlier in the modulation application 422 procedure to render the second of the identified 414 public image and identified 418 private image in a layered fashion over the first rendered image. Alternatively, a marking engine may be associated with a media transport mechanism (see FIG. 5) that can automatically return media marked with the first image to a media input to allow the returned media to be marked in a layered or overlapping fashion with the second image.

Figure 5:
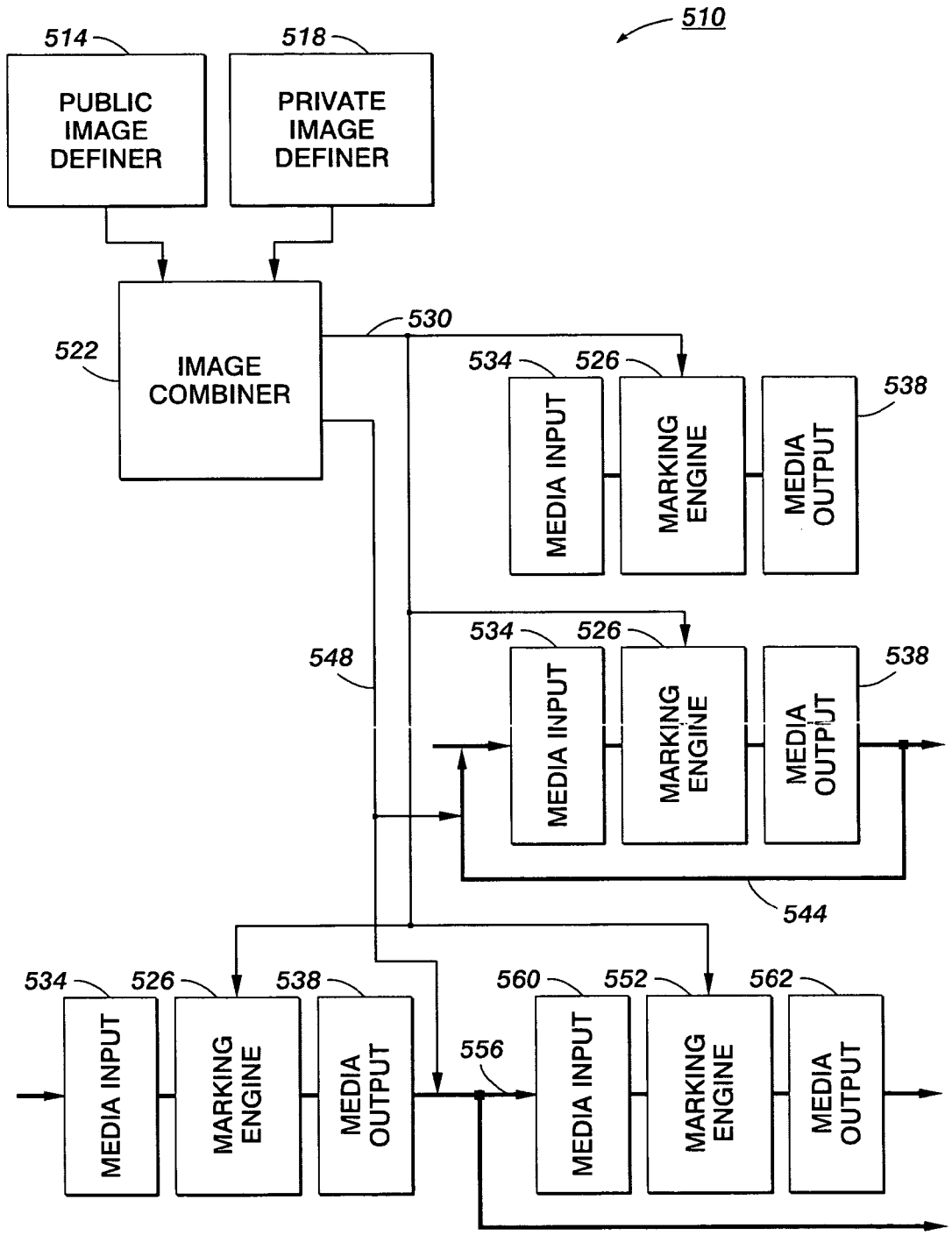
FIG. 5 is a block diagram of a various document processing systems.

In still other embodiments, two or more marking engines may be interconnected by a transport mechanism (e.g., see FIG. 5). In such embodiments, applying 422 the modulation and printing 426 the modulated public image in accord with the applied 422 modulation can include directing a first print engine to mark print media with a first of the identified 414 public image and the identified 418 private image, directing the transport mechanism to deliver print media with the first image to an input of a second marking engine and directing the second marking engine to mark the second of the identified 414 public image and the identified 418 private image in an overlapping, overlaid or overprinted manner with respect to the first image.

Referring to FIG. 5, a document processing system 510 can include a public image definer 514, a private image definer 518 and an image combiner 522. Additionally, the system 510 can include or be associated with one or more marking engines (e.g., 526).

FIG. 5 shows three different marking engine configurations. These configurations are illustrative only. A document processing system can include or be associated with one or more of these marking engine configurations, and/or other marking engine configurations.

The public image definer 514 can be operative to generate or identify a public portion of a document to be rendered with a first colorant and a first colorant density to render the public portion at a public portion optical density.

The private image definer 518 can be operative to generate or identify a private portion of the document to be rendered with a second colorant and second colorant density sufficient to render the private portion at an optical density that, when contrasted with the public portion, is sufficiently different to be perceptible in contrast with the public optical density when the document is viewed in transmission, at glancing angles and/or when the document is scanned and processed through contrast enhancement but insufficient to be perceived when viewed casually in reflection by the HVS. The second colorant can be the same as the first colorant. For instance, the first colorant and the second colorant can both be a black colorant, such as, a toner or an ink. Furthermore, the first colorant and the second colorant can include a plurality of colorants, such as, for example, cyan, magenta, yellow and/or black colorants. Furthermore, the first colorant and the second colorant can include different colorants or different combinations of colorants.

For example, the public image definer 514 and the private image definer 518 can be embodied in a document authoring tool that allows a document to be defined or created in terms of layers or that allows image portions to be placed on top of one another in a layered or overlapping fashion. The definers 514 and 518 may accept scanned images or images from other sources and/or accept input from a system user or operator through a keyboard, mouse or other user interface device as components of a public and/or private image definition. Additionally, the definers 514, 518 may allow a system user or operator to move, rotate, resize and otherwise manipulate image data in order to allow the user to position, align or fit an identified 418 private image or image portion (e.g., 310) within an identified 414 public image or public image portion (e.g., 318).

The image combiner 522 can be operative to control, directly or indirectly, one or more a marking engines (e.g., 526) so as to print a combination of the identified 414 public image and the identified 418 private image. For example, where applying 422 the modulation to the public image in accord with the private image includes digitally combining the identified 414 public image with the identified 418 private image, the image combiner 522 can be operative to digitally combine the public portion of the document and the private portion of the document and associate the public portion with the first colorant and the first colorant density and associate the private portion of the document with the second colorant density wherein the second colorant and second colorant density are sufficient to render the private portion at an optical density that is above the threshold optical density beyond which the human visual system has a low sensitivity to density differences and that is different than the optical density of the first colorant density, thereby generating a combined image. Alternatively, the image combiner 522 can be operative to digitally combine the public portion of the document and the private portion of the document and associate the public portion with the first colorant and the first colorant density and associate the private portion of the document with the second colorant density wherein the second colorant and second colorant density are sufficient to render the private portion at an optical density that is sufficiently similar to the public optical density so as to be difficult for the HVS to perceive in reflection, but sufficiently different from the public optical density so as to be detectable when viewed in transmission, at glancing angles or when scanned and processed through contrast enhancing algorithms. Additionally, or alternatively, the image combiner 522 can be operative to control the one or marking engines (e.g., 526) so as to print the combined image. For instance, the image combiner 522 may generate a marking engine control signal 530 based on the digitally combined image and use that marking engine control signal 530 to control one or more marking engines (e.g., 526) to print 426 the modulated public image in accord with the applied 422 modulation.

Alternatively, as indicated above, applying 422 the modulation and printing 426 modulated public image in accord with the applied 422 modulation occur contemporaneously, and the image combiner 522 is operative to generate a marking engine control signal 530 that directs one or more marking engines (e.g., 526) to render one of the identified 414 public image or the identified 418 private image on a preprinted document including the other of the identified 414 public image or the identified 418 private image, or the image combiner 522 is operative to generate marking engine control signals 530 directing one or more marking engine (e.g., 526) to render first one and then the other of the identified 414 public image and the identified 418 private image in an overlapping or overprinted manner.

For instance, an operator or system user may load a media input 534, or input tray associated therewith, with preprinted documents including an identified 414 public image or an identified 418 private image and the image combiner 522 generates marking engine control signals 530 to control a marking engine (e.g., 526) to print 426 the other of the identified public 414 or private 418 image or image portion in a layered, overlapping or overprinted fashion with respect to the preprinted image. Alternatively, the media input 534, or tray associated therewith, is loaded with blank print media, such as, paper or velum, and the image combiner 522 generates marking engine control signals 530 directing one or more marking engines (e.g., 526) to print one and then the other of the identified 414, 416 public and private images or image portions. For example, after printing a first of the identified 414, 418 public or private image, the marking engine 526 delivers marked sheets to a media output 538, and a system user or operator manually returns the print media containing the first image to the media input 534 of the marking engine or to a media input of a second marking engine and the image combiner 522 controls the marking engine 526 (or a second marking engine) to print the second of the identified public 414 or private 418 image or image portion in an overlapping, layered or overprinted fashion with respect to the first image.

Alternatively, the system 510 includes a media transport system 544 that is operative to receive media from the media output (e.g., 538) and return the media to the media input (e.g., 534). In such embodiments, the image combiner 522 can be operative to control the at least one marking engine (e.g., 526) to print a first of the public portion or image and the private portion or image on a sheet of media, deliver the sheet to the media output 538 and generate transport control signals 548. For example, the transport control signals can direct the media transport 544 to receive the sheet from the media output 538 and return the sheet to the media input 534. The image combiner 522 may then control the at least one marking engine (e.g., 526) to receive the sheet from the media input 534 an print a second of the public portion or image (e.g., 210) and the private portion or image (e.g., 310) on top of the first of the public portion (e.g., 210) and the private portion (e.g., 310) in an overlapping, layered or overprinted manner.

In yet another embodiment, the system 510 includes a first marking engine 526, a second marking engine 552 and a transport system 556 that is operative to transport print media from an output (e.g., 538) of the first marking engine (e.g., 526) to an input 560 of the second marking engine 552. In such embodiments, the image combiner 522 can be operative to control the first marking engine (e.g., 526) to print a first of the public image or image portion (e.g., 414) and the private image or image portion (e.g., 418) on a portion of print media, control the transport system 556 to deliver the media from a media output (e.g., 538) of the first marking engine (e.g., 526) to a media input 560 of the second marking engine 552, and control the second marking engine 552 to print a second of the public image or image portion (e.g., 414) and the private image or image portion (e.g., 418) on top of the first of the public portion or image (e.g., 414) and the private portion or image (e.g., 418) in an overlapping, layered or overprinted manner and, for example, deliver the overprinted document or print media to a media output 562 of the second marking engine 552.

For instance, the image definers 514, 518 may comprise components of a layout module of a document authoring tool. For example, the layout module may be software run on a personal computer or in a digital front end of a document processing system. For instance, the layout module may be operative to present a public image to assist an operator and allow the operator to designate a private portion and to identify at least one portion of the public image to be associated or overlaid with the private image. Additionally, or alternatively, the image definers 514, 518 may be components of or associated with a scanning module that is operative to scan a first image identified 414, 418 as one of the public image and the private image, store the first scanned image, scan the second image identified 414, 418 as the other of the public image and the private image and store the second scanned image for use by the image combiner.

The marking engines (e.g., 526, 552) may be based on any marking technology including, but not limited to, ink jet, electrophotographic and xerographic marking engine technologies. The marking engine(s) may be tightly coupled to, in close proximity with and or directly connected to the device that includes the image combiner 522. Alternatively, the marking engine(s) may be separated from the image combiner 522 in space and or time. For instance, the signals 530, 548 from the image combiner 522 may be delivered via a computer network or via computer media, such as, but not limited to, floppy disk or CD ROM.

The transport systems (e.g., 544, 556) may be based on any media transport technologies including, but not limited to, conveyor belts, cylindrical or disk shaped nips, vacuum, air jet or spherical nip based transport technology.

Although, for the most part, embodiments have been described with reference to monochrome or black and white printing, the claims can encompass embodiments providing document security in color or multi-colorant based images.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

The invention claimed is:

1. A method for providing security for a document, the method comprising:
   printing a public portion of the document at a public portion optical density; and
   printing a private portion of the document, within a position of at least a portion of the public portion of the document, at a private portion optical density that is sufficient to generate a private or combined optical density that is sufficiently different from the public optical density to be perceptible in contrast with the public optical density when the document is viewed in transmission, at glancing angles and/or when the document is scanned and processed through contrast enhancement, but insufficient to be perceived when viewed casually in reflection by the human visual system;

wherein printing the public portion and printing the private portion comprises printing the public portion and printing the private portion with a same colorant or set of colorants.

2. The method of claim 1 wherein printing a private portion of the document, within a position of at least a portion of the public portion comprises one of:

printing the private portion and printing the public portion over the private portion in layered fashion and printing the public portion and printing the private portion over the public portion in layered fashion.

3. The method of claim 1 wherein printing a private portion of the document, within a position of at least a portion of the public portion comprises one of:

combining, digitally, the public portion of the document and the private portion of the document and associating the public portion with a first colorant density having the public portion optical density above a threshold optical density a beyond which the human visual system has a low sensitivity to density differences and associating the private portion of the document with a second colorant density having the private portion optical density above the threshold optical density and different than the optical density of the first colorant density, thereby generating a combined image; and printing the combined image.

4. The method of claim 1 wherein printing the public portion comprises:

printing the public portion with an optical density sufficient to generate a lightness measurement of no greater than about $L^*=8$.

5. The method of claim 1 wherein printing the private and public portion comprises:

printing the public portion with a public colorant and public colorant density sufficient to generate the public optical density sufficient to generate a lightness measurement of no greater than about $L^*=8$ and printing the private portion with a private colorant and private colorant density sufficient to generate the private or combined optical density sufficient to generate a lightness measurement of no greater than about $L^*=7.5$.

6. The method of claim 1 wherein printing the private and public portion comprises:

printing the public portion with a public colorant and public colorant density sufficient to generate the public optical density sufficient to generate a lightness measurement of no greater than about $L^*=8$ and printing the private portion with a private colorant and private colorant density sufficient to generate the private or combined optical density sufficient to generate a lightness measurement of no greater than about $L^*=6$, wherein the private colorant and the public colorant comprise a same colorant or set of colorants.

7. The method of claim 1 wherein printing the private and public portion comprises:

printing the private portion with a private colorant and private colorant density sufficient to generate the private or combined optical density sufficient to generate a lightness measurement of no greater than about $L^*=8$ and printing the public portion with a public colorant and public colorant density sufficient to generate the public optical density sufficient to generate a lightness measurement of no greater than about $L^*=7.5$, wherein the private colorant and the public colorant comprise a same colorant or set of colorants.

8. The method of claim 1 wherein printing the private and public portion comprises:

printing the private portion with a private colorant and private colorant density sufficient to generate the private or combined optical density sufficient to generate a lightness measurement of no greater than about $L^*=8$ and printing the public portion with a public colorant and public colorant density sufficient to generate the public optical density sufficient to generate a lightness measurement of no greater than about $L^*=6$, wherein the private colorant and the public colorant comprise a same colorant or set of colorants.

9. The method of claim 1 wherein printing the public portion and printing the private portion comprises:

printing the public portion and printing the private portion with a black colorant.

10. The method of claim 1 wherein printing the public portion and printing the private portion comprises:

printing the public portion and the private portion at respective public and private optical densities that would generate a $\Delta L^*$ of equal to or less than about 1.

11. A document processing system comprising
at least one marking engine;
a public image definer that is operative to generate or identify a public portion of a document to be rendered with a first colorant and first colorant density sufficient to render the public portion at an optical density above a threshold optical density beyond which the human visual system has a low sensitivity to density differences;
a private image definer that is operative to generate or identify a private portion of the document to be rendered with a second colorant and second colorant density sufficient to render the private portion at an optical density that, when combined with and contrasted with the public portion, is sufficient to be perceptible in contrast with the public optical density when the document is viewed in transmission, at glancing angles and/or when the document is scanned and processed through contrast enhancement, but insufficient to be perceived when viewed casually in reflection by the human visual system;
an image combiner that is operative to control the at least one marking engine so as to print a combination of the public image and the private image.

12. The system of claim 11 further comprising:
a media input; and
a media output wherein the media input and the media output are associated with the at least one marking engine, and wherein the image combiner is operative to control the at least one marking engine to print a first of the public portion and the private portion on a sheet of media, deliver the sheet of media to an output tray, receive an indication from a system operator that the sheet of media has been placed at the media input, and control the at least one marking engine to receive the sheet from the media input and print a second of the public portion and the private portion on the sheet of media on top of the first of the public portion and the private portion in an overlapping manner.

13. The system of claim 11 further comprising:
a media input;

a media output wherein the media input and the media output are associated with the at least one marking engine; and a media transport system that is operative to receive media from the media output and return the media to the media input, wherein the image combiner is operative to control the at least one marking engine to print a first of the public portion and the private portion on a sheet of media, deliver the sheet of media to the media output, direct the media transport to receive the sheet from the media output and return the sheet to the media input, and control the at least one marking engine to receive the sheet from the media input and print a second of the public portion and the private portion on top of the first of the public portion and the private portion in an overlapping manner.

14. The system of claim 11 wherein the image combiner is operative to digitally combine the public portion of the document and the private portion of the document and associate the public portion with the first colorant and first colorant density and associating the private portion of the document with the second colorant and second colorant density, wherein the second colorant and second colorant density are sufficient to render the private portion at an optical density that is above the threshold optical density beyond which the human visual system has a low sensitivity to density differences and that is different from the optical density of the first colorant density, thereby generating a combined image, and to control the at least one marking engine so as to print the combined image.

15. The system of claim 11 wherein the at least one marking engine comprises:
a first marking engine;
a second marking engine; and
a transport system that is operative to transport print media from an output of the first marking engine to an input of the second marking engine, and wherein the image combiner is operative to control the first marking engine to print a first of the public portion and the private portion on a portion of print media, control the transport system to deliver the print media from a media output of the first marking engine to a media input of the second marking engine, and control the second marking engine to print a second of the public portion and the private portion on top of the first of the public portion and the private portion in an overlapping manner.

16. The system of claim 11 wherein the public image definer and the private image definer comprise components of a lay-out module of a document authoring tool that is operative to present a public image to a system operator and allow the operator to designate the private portion and to identify at least one portion of the public image to be associated with the private image.

17. The system of claim 11 wherein the public image definer and the private image definer comprise components of a scanning module of a document authoring tool that is operative to scan a first image identified as one of the public image and the private image, store the first scanned image, scan a second image, identified as the other of the public image and the private image and store the second scanned image for use by the image combiner.

18. The system of claim 11 wherein the a public image definer is operative to generate or identify a public portion of a document to be rendered only with a black colorant and the private image definer is operative to generate or identify a private portion of the document to be rendered only with the black colorant.

19. The system of claim 11 wherein the at least one marking engine comprises:
at least one of an inkjet, electrophotographic and xerographic marking engine.

20. A method for providing security for a document, the method comprising:
identifying a public image to be included on the document;
identifying a private image to be included in the public image;
applying a modulation to a high optical density portion of the public image in accord with the private image;
printing the modulated public image with a modulated colorant density in accord with the applied modulation, such that the modulation is detectable in contrast with unmodulated portions of the public image when the document is viewed in transmission, at glancing angles and/or when the document is scanned and processed through contrast enhancement, and is not perceived when viewed casually in reflection by the human visual system.

21. The method of claim 20 wherein printing the modulated public image with a modulated colorant density comprises one of:
printing the private portion and printing the public portion over the private portion in layered fashion, and printing the public portion and printing the private portion over the public portion in layered fashion, wherein the public portion is printed at a public portion optical density which is above a threshold optical density beyond which the human visual system has a low sensitivity to density differences during casual observation; and
printing the private portion of the document, in an overlapping relationship within a position of at least a portion of the public portion of the document.

22. The method of claim 20 wherein applying the modulation comprises:
adjusting colorant values of portions of the public image according to the private image such that adjusted and unadjusted colorant values of the public image call for colorants and colorant densities associated with optical densities that are above an optical density threshold beyond which the human visual system has a low sensitivity to density differences during casual observation.

23. The method of claim 22 further comprising:
printing the document in accord with the adjusted and unadjusted colorant values.

* * * * *